Patented Sept. 19, 1939

2,173,491

UNITED STATES PATENT OFFICE 2,173,491

2-ALKYLHEXAHYDROBENZTHIAZOLES AND 2-ALKYLHEXAHYDROBENZSELENAZOLES

Walter Zeh, Wolfen, Kreis Bitterfeld, Germany, assignor, by mesne assignments, to Agfa Ansco Corporation, Binghamton, N. Y., a corporation of Delaware No Drawing. Application September 14, 1937, Serial No. 163,750. In Germany September 16, 1936

4 Claims. (Cl. 260—298)

This invention relates to 2 alkyl-hexahydrobenzthiazoles and -selenazoles.

It is an object of the present invention to provide a process by which these products may be obtained. Still further objects will be apparent from the detailed specification following hereafter.

This invention is based on the observation that the hitherto unknown 2-alkylhexahydrobenzthiazoles and selenazoles can be obtained by causing an ortho-halogen-cyclohexylamine to react with a thio- or seleno-fatty acid amide or a derivative thereof. In this manner there are obtained compounds having the general formula

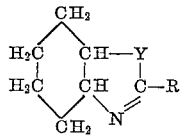

wherein

Y stands for sulphur or selenium and
R stands for alkyl, for example methyl or ethyl, or for aralkyl.

The thio- or seleno-fatty acid amides can be substituted in known manner, for example a phenyl fatty acid amide can be used. The ortho-halogen-cyclohexylamines can be obtained by the process of Osterburg and Kendall (Journ. American Chem. Soc., vol. 42, 1920, pages 2621–25). The reagents may be caused to react alone, or in the presence of a diluent, preferably under the action of heat.

The reaction can also be carried through in the cold but a considerably longer time is necessary until reaction sets in. At room temperature for instance there may elapse 10 days to a fortnight before the reaction has taken place to any considerable degree.

The benzthiazoles or selenazoles prepared by the invention are valuable raw materials for producing dyestuffs for use in photography. Thus the quaternary ammonium salts of these bases may be condensed in known manner with one another, or with other heterocyclic bases to give cyanine dyestuffs.

The following examples illustrate the invention without limiting it to the specific details set forth therein.

Example 1

26.5 grams of ortho-chlorcyclohexalamine are intimately mixed with 15 grams of thioacetamide. After warming for a short time, a powerful reaction occurs. To complete the reaction, the mixture is heated for 15 minutes on the steam bath. To the mass are then added 100 cc. of 20 per cent soda lye of 20 per cent strength with cooling, and the precipitated base is taken up with ether. The ethereal solution is dried and the residue remaining after distilling the ether is fractionally distilled under reduced pressure. At 10 mm. the methylhexahydrobenzthiazole passes over at 130–160° C. in the form of a yellow oil.

Example 2

13 grams of ortho-chlorocyclohexalamine is heated with 12 grams of selenoacetamide for about 1 hour on the steam bath. The viscous mass produced is extracted with boiling dilute hydrochloric acid. The acid solution is supersaturated with soda lye, and then extracted with ether. The dried ethereal extract is distilled and the residue is fractionated at reduced pressure. At 15 mm. the 2-methylhexahydrobenzselenazole passes over at 120–160° C. in the form of a yellow oil with a boiling point of 140° C.

Example 3

34 g. of ortho-bromocyclohexylamine are mixed with 10 grams of xylene and 16,5 grams of thiopropionamide (prepared from propion-amide with the aid of phosphorus penta-sulfide). The mixture is warmed until reaction sets in and then heated for another 30 minutes on the steam bath. After this 100 ccm. icy cold sodium hydroxide solution of 20 per cent strength are added with cooling. The base which has formed -2 ethylhexahydrobenzthiazole- is extracted with ether together with the xylene. After the drying of the ethereal solution the ether is distilled off at normal pressure and the xylene in vacuo. The residue, the crude base, is dissolved in a little methanol, poured into aqueous hydrochloric acid, whereupon the base may be extracted with ether. After evaporation of the ether the 2-ethylhexahydrobenzthiazole remains. It may be used in this state for further synthesis.

Example 4

26,5 grams of ortho-chlorocyclohexylamine are mixed with 30 grams of phenylthioacetamide and warmed on the steam bath. The reaction is carried to its end in about 30 minutes. To the mixture there are then gradually added with cooling 100 cc. of cold sodium hydroxide solution of 20 per cent strength and the resulting base of the formula

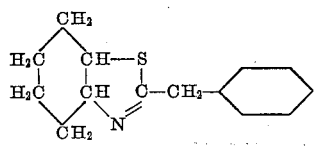

is taken up with ether. The ethereal solution is dried. The brownish residue which remains after evaporation is either distilled in a high vacuum or purified as follows: The crude base is dissolved in methanol and poured into an excess of hydrochloric acid of 10 per cent strength. The solution is decantated from the oily products, made alkaline with soda and the base again extracted with ether. By this treatment the base is so far purified that it may serve as a starting material for the synthesis of dyestuffs.

What I claim is:

1. As a new product, a compound having the following general formula

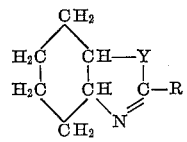

wherein Y stands for a member of the group consisting of S, Se and R stands for a member of the group consisting of alkyl and aralkyl.

2. As a new product, 2-methylhexahydrobenzthiazole.

3. As a new product, 2-methylhexahydrobenzselenazole.

4. As a new product, a 2-benzylhexahydrobenzthiazole.

WALTER ZEH.